United States Patent
Krátký et al.

(10) Patent No.: US 11,987,519 B2
(45) Date of Patent: May 21, 2024

(54) GLASS CERAMIC MATERIAL OF A SPINEL TYPE FOR THE PRODUCTION OF FASHION JEWELLERY AND JEWELLERY STONES

(71) Applicant: PRECIOSA, A.S., Jablonec nad Nisou (CZ)

(72) Inventors: Rostislav Krátký, Pěnčín (CZ); Jakub Altšmíd, Frýdlant (CZ); Romana Kalužná, Jenišovice (CZ)

(73) Assignee: PRECIOSA, A.S., Jablonec Nad Nisou (CZ)

( * ) Notice: Subject to any disclaimer, the term of this patent is extended or adjusted under 35 U.S.C. 154(b) by 315 days.

(21) Appl. No.: 17/404,752

(22) Filed: Aug. 17, 2021

(65) Prior Publication Data
US 2021/0380473 A1    Dec. 9, 2021

Related U.S. Application Data

(63) Continuation of application No. PCT/CZ2019/050033, filed on Aug. 9, 2019.

(30) Foreign Application Priority Data

Feb. 18, 2019   (CZ) .................................. CZ2019-91

(51) Int. Cl.
*C03C 10/00*    (2006.01)
*A44C 17/00*    (2006.01)

(52) U.S. Cl.
CPC ........ *C03C 10/0054* (2013.01); *A44C 17/008* (2013.01)

(58) Field of Classification Search
CPC . C03C 10/00; C03C 10/0036; C03C 10/0045; C03C 3/062
See application file for complete search history.

(56) References Cited

U.S. PATENT DOCUMENTS 3,681,102 A   8/1972   Beall
3,873,329 A   3/1975   Beall
(Continued)

FOREIGN PATENT DOCUMENTS

CZ    2010575 A3    9/2011
JP    03164445 A  *  7/1991    ............. C03C 10/00
(Continued)

OTHER PUBLICATIONS

Kurt Nassau, Heat Treating Ruby and Sapphire: Technical Aspects, Gems & Gemology, Fall 1981, 11 pages.

*Primary Examiner* — Shuangyi Abu Ali
(74) *Attorney, Agent, or Firm* — Reinhart Boerner Van Deuren P.C.

(57) ABSTRACT

Glass ceramic material for the production of synthetic stones in fashion jewellery and jewellery, having excellent mechanical properties, chemical and heat resistance, harmless due to absence of lead, arsenic and cadmium compounds, available in a broad scale of colour designs, imitating faithfully natural precious stones thanks to high content of spinel crystalline phase and lowered content of $SiO_2$, consisting of (in weight %):
20-40% $SiO_2$,
1.5-10% $B_2O_3$,
20-35% $Al_2O_3$,
0.1-20% MgO,
0.1-20% ZnO,
the content of MgO+ZnO being at least 10%,
preferably also
0-15% $TiO_2$,
0.1-15% $ZrO_2$,
the content of $TiO_2$+$ZrO_2$ being at least 5%,
more preferably also (Continued)

0-20% of colouring additives in the form of CoO, NiO, CuO, $Fe_2O_3$, $MnO_2$, $Cr_2O_3$, $V_2O_5$, $Pr_2O_3$, $CeO_2$, $Nd_2O_3$, $Er_2O_3$, AgO and Au.

13 Claims, 1 Drawing Sheet

(56) References Cited

U.S. PATENT DOCUMENTS

| | | |
|---|---|---|
| 3,936,287 A | 2/1976 | Beall et al. |
| 4,154,282 A | 5/1979 | Kull |
| 5,070,045 A | 12/1991 | Comte et al. |
| 5,179,045 A | 1/1993 | Aitken et al. |
| 5,256,600 A | 10/1993 | Pfitzenmaier |
| 5,476,821 A | 12/1995 | Beall et al. |
| 5,491,115 A | 2/1996 | Pfitzenmaier et al. |
| 6,632,758 B2 | 10/2003 | Beall et al. |
| 9,801,435 B2 | 10/2017 | Dymshits et al. |

FOREIGN PATENT DOCUMENTS

| | | |
|---|---|---|
| RU | 2613520 C1 | 3/2017 |
| WO | WO 2010/142256 A2 | 12/2010 |

* cited by examiner

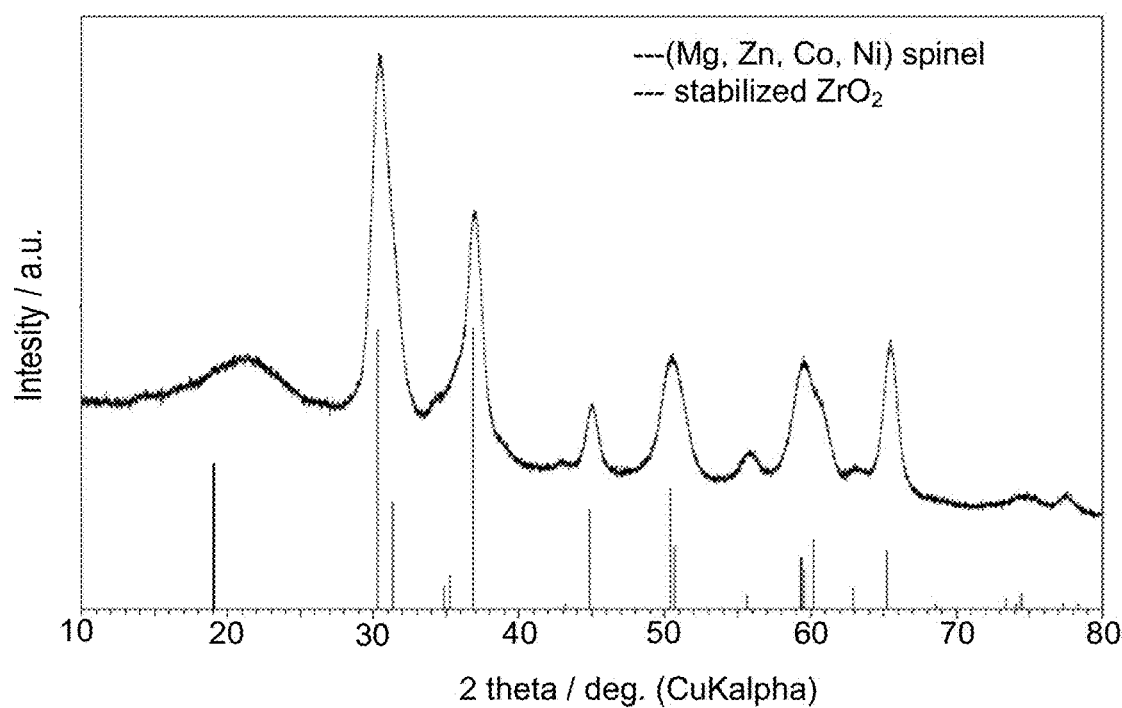

GLASS CERAMIC MATERIAL OF A SPINEL TYPE FOR THE PRODUCTION OF FASHION JEWELLERY AND JEWELLERY STONES

CROSS-REFERENCE TO RELATED PATENT APPLICATIONS

This patent application is a continuation of co-pending PCT Patent Application No. PCT/CZ2019/050033, filed Aug. 9, 2019, designating the United States, the entire teachings and disclosure of which are incorporated herein by reference thereto.

FIELD OF THE INVENTION

The present invention relates to a new glass ceramic material for the production of synthetic stones in fashion jewellery and jewellery industries. It is formed by aluminium-boron-silicate glass matrix with a homogeneously dispersed crystalline phase formed by nanocrystals of a spinel type and nucleators. The refractive index of the material is higher than 1.62 and its density is higher than 3.1 g·cm$^{-3}$ and the Young modulus of elasticity is higher than 110 GPa. The material does not contain compounds of lead, cadmium, arsenic, lithium. By using suitable additives, it can be prepared in a wide scale of colours. Thanks to the crystallization of primarily melted glass, the material achieves better mechanical, heat and chemical resistances. Thanks to a high content of the crystalline phase of the spinel type, the material enables a faithful imitation of the appearance and properties of natural precious stones.

PRIOR ART

The fashion jewellery and jewellery industries use, apart from natural materials, also several types of synthetic materials. The main material used in production of fashion jewellery stones is glass (for example WO 2010142256, CZ 2010-575). Its advantage is a good hot shapeability and a very wide scale of colour hues; its disadvantages are a low refractive index, due to which the stone must be provided with a reflective layer, and a low heat resistance, due to which it is impossible to process the stone by the jewellery technology of pouring with molten metal—by the lost wax method (for example U.S. Pat. No. 4,154,282).

In jewellery industry, the dominant colourless synthetic material is the monocrystalline zirconium oxide stabilised by yttrium (Nassau, Gems & Gemology, 1981). Its advantages are a high refractive index, dispersion and thermal stability. Its disadvantages are very limited colour range and a very low material yield when producing the final stone, caused by irregular shapes of initial crystals.

Apart from that, jewellery industry uses for coloured stones namely monocrystalline synthetic spinel and corundum, and glass ceramic materials based on yttrium, lithium, magnesium, and zinc aluminosilicates.

Aluminium-silicate glass/glass ceramic with rare earth oxides ($RE_2O_3$), namely $Y_2O_3$ for fashion jewellery and jewellery use, is disclosed by the patent EP 3339262. The base composition comprises (in weight %): 0-30% $SiO_2$, 10-50% $Al_2O_3$, 20-70% $Y_2O_3+La_2O_3$, 0.1-20% $Nb_2O_5$. The advantages of this material include, apart from wide possibilities of colouring, also a high refractive index, optical dispersion, mechanical, chemical and heat resistance.

Glass ceramic based on lithium aluminosilicates is used for the production of cooking hobs and cookware. The company Corning Inc. has many patents in this field, including patents related to colouring (U.S. Pat. Nos. 5,491,115, 5,070,045, 5,179,045, 5,256,600).

Patent RU 2613520 discloses a polycrystalline synthetic jewellery material. Transparent ceramic is produced by the combination of CIP (cold isostatic pressing) and HIP (hot isostatic pressing) methods and comprises YAG crystalline phases and spinel.

U.S. Pat. No. 6,632,758 discloses the preparation of transparent glass ceramic material comprising crystals of aluminosilicate spinel. The potential use of this material is in optics (fibres, lasers, amplifiers).

Patent CN 10205058 discloses aluminium-silicate glass ceramic and a method of its preparation. The main crystalline phases are spodumene, petalite and eucryptite. The use of this non-transparent material is namely in the building industry.

Glass ceramic material with high Young modulus is disclosed in U.S. Pat. No. 5,476,821. The suggested composition comprises (in weight %): 35-60% $SiO_2$, 20-35% $Al_2O_3$, 0-25% MgO, 0-25% ZnO, at least 10% MgO+ZnO, 0-20% $TiO_2$, 0-10% $ZrO_2$, 0-2% $Li_2O$, 0-8% NiO and optionally other additional oxides. The main crystalline phase is spinel; the material is used in memory devices. The transparency of the material is not required. Similar material, with the presence of other crystalline phases (sapphirine, α and β quartz), is disclosed in older patents U.S. Pat. Nos. 3,873,329 and 3,936,287.

Transparent glass ceramic material with the addition of $Cr_2O_3$ and similar photoluminescence to that of a synthetic ruby is disclosed in U.S. Pat. No. 3,681,102. The suggested composition comprises (in weight %): 55-75% $SiO_2$, 8-25% $Al_2O_3$, 2-20% ZnO, 0.01-1% $Cr_2O_3$ and 2-12% $ZrO_2$. The main crystalline phase is gahnite.

Heat resistant glass ceramic material for jewellery is disclosed in U.S. Pat. No. 9,801,435. The suggested composition comprises (in mol. %): 45-72% $SiO_2$, 15-30% $Al_2O_3$, 0.1-23.9% MgO, 0.1-29% ZnO, 1-18% $Li_2O$, 0.1-7% PbO, 0.1-10% $ZrO_2$, 0.1-15% $TiO_2$ and colouring components NiO, CoO, CuO, $Cr_2O_3$, $Bi_2O_3$, $Fe_2O_3$, $MnO_2$, $CeO_2$, $Nd_2O_3$, $Er_2O_3$, $Pr_2O_3$ and Au. A very low coefficient of thermal expansion, and thanks to that also a high resistance against thermal shocks, is caused by the presence of solid solution of lithium-magnesium-zinc-aluminosilicates with virgilite or keatite structure. Apart from that, the material comprises at least one of the following crystalline phases: spinel, sapphirine, enstatite, petalite, aluminium magnesium titanate, cordierite, willemite, zircon, rutile, zirconium titanate, $ZrO_2$. The melting point of the material is lower than 1570° C.

Magnesium and/or zinc aluminosilicate glass ceramic materials are generally applicable in jewellery industry due to their mechanical, thermal and optical properties. The patents mentioned, however, do not deal with the possibility of targeting the composition to achieve primarily spinel phase, and thus imitating the appearance and properties of natural precious stones.

BRIEF DESCRIPTION OF THE FIGURE

The FIGURE is an X-ray diffractogram with analysed phases that shows that the material contains only the spinel phase and $ZrO_2$ which was used as the nucleation agent.

SUMMARY

The subject matter of the invention is a material for jewellery and fashion jewellery use—transparent, translucent or opaque glass ceramic of a spinel type with the refractive index of at least 1.62, with high mechanical toughness and very good heat resistance, not containing compounds of lead, arsenic, cadmium and lithium, ensuring maximum health safety. Due to the high content of spinel crystalline phase and a reduced content of $SiO_2$, this material can be coloured by the addition of various oxides so that it faithfully imitates colours of natural precious stones (namely spinel and gahnite).

The invention relates to a material for jewellery and fashion jewellery stone, which consists (in weight %) of:
20-40% $SiO_2$,
1.5-10% $B_2O_3$
20-35% $Al_2O_3$,
0.1-20% MgO
0.1-20% ZnO
while the content of MgO+ZnO is at least 10%,
preferably also of
0-15% $TiO_2$
0.1-15% $ZrO_2$
while the content of $TiO_2$+$ZrO_2$ is at least 5%
and more preferably also of
0-20% of colouring additives in the form of CoO, NiO, CuO, $Fe_2O_3$, $MnO_2$, $Cr_2O_3$, $V_2O_5$, $Pr_2O_3$, $CeO_2$, $Nd_2O_3$, $Er_2O_3$, AgO and Au.

The invention thus relates to a glass ceramic material with a reduced content of $SiO_2$ comprising only the spinel crystalline phase and crystalline phases connected with nucleation agents ($ZrO_2$, $ZrTiO_4$), with a high heat, mechanical and chemical resistance.

Parameters of the material according to the invention are mentioned in Table 1.

TABLE 1

Selected properties of the new material

| Parameter | Unit | Value |
| --- | --- | --- |
| Refractive index | | ≥1.62 |
| Density | [g.cm$^{-3}$] | ≥3.1 |
| Young modulus of elasticity | [GPa] | ≥110 |
| Hardness by Vickers | | ≥900 |
| Melting temperature | [° C.] | ≥1550 |
| Transformation temperature Tg | [° C.] | ≥745 |
| Crystalline phase share | [%] | ≥20 |
| Coefficient of thermal expansion | [·10$^{-7}$ K$^{-1}$] | 35-55 |

The base glasses were prepared by homogenization of the initial components and by melting in a platinum or $SiO_2$ crucible at temperatures between 1550° C. a 1700° C. The molten glass was homogenized by means of platinum or $SiO_2$ stirrer and subsequently cast into a pre-heated mould and transferred into a cooling furnace heated to the temperature of 600-650° C. in order to relax the inner tension and then cooled down in a controlled way to room temperature. The cooled blocks were cut into slices or prisms of suitable dimensions, which were subsequently subjected to controlled crystallization.

The crystallization of glass was conducted in two stages at temperatures optimized by DSC analysis. By selecting nucleation temperature (Tn), crystallization temperature (Tc), the heating rate and the holding time at the selected temperature, the crystallization process can be controlled in terms of size and amount of crystalline phase (Z. Strnad, Skelně krystalické materiály, 1983). In order to achieve a transparent material, it is necessary (in case of the cubic spinel phase) to keep the size of the crystalline particles at most 50 nm. By increasing the size of the crystallites above this value, first opalescent colouration of the material occurs and consequently, with further crystal growth, transparency is lost totally. Nucleation temperatures according to the detected transformation temperatures Tg ranged between 600° C. and 700° C., temperatures of subsequent crystallization for transparent material ranged between 750° C. and 950° C., temperatures of subsequent crystallization for opaque material ranged between 950° C. and 1100° C. The specific temperature regimes are mentioned in Table 2 in connection with examples of embodiment. An example of X-ray diffractogram with analysed phases is on the FIGURE. The diffractogram shows that the material contains only the spinel phase and $ZrO_2$ which was used as the nucleation agent.

The material prepared in this way may be processed by cutting, grinding and polishing into the desired shape of fashion jewellery or jewellery stone.

The base of the new glass ceramic material is aluminium-boron-silicate glass matrix with ZnO and MgO, which is toxically harmless. During the process of heterogeneous bulk nucleation, separated areas of solid solutions $ZrO_2$—$TiO_2$ and/or $ZrO_2$ and/or $ZrTiO_4$ nanocrystals are formed in the matrix. The reduced content of $SiO_2$, the optimised amount and ratio of MgO and ZnO and namely the addition of $B_2O_3$ contribute to the fact that during the subsequent crystallization process only spinel phases are formed and the generation of other undesirable phases (for example quartz, sapphirine, enstatite, willemite, mullite, petalite, cordierite) is suppressed. This distinguishes the new material from the materials disclosed in the patents mentioned above, in particular U.S. Pat. No. 9,801,435. In addition, it does not contain lithium, lead or other undesirable compounds. The addition of $B_2O_3$ changes the kinetics of the crystallization, broadens the temperature range for the formation of the spinel phase and, moreover, reduces the melting point of the primary glass. This makes it possible to melt the material in conventional electric furnace in a platinum or quartz crucible.

The base glass ceramic material can be, by modification of its composition, coloured into colour hues faithfully imitating the colours of natural precious stones, namely spinels and gahnites, but also sapphires, amethysts, emeralds, rubies, etc. The new material is especially suitable for deep blue, green and blue-green hues. The change in colouring may be achieved by the addition of one or more components selected from the group of oxides CoO, NiO, CuO, $Fe_2O_3$, $MnO_2$, $Cr_2O_3$, $V_2O_5$, $Pr_2O_3$, $CeO_2$, $Nd_2O_3$, $Er_2O_3$, AgO and/or Au in the amount of 0-20 weight %.

The material has suitable mechanical properties, which is the hardness greater than 6.5 according to Mohs scale ((≥900 according to Vickers) guaranteeing to products good resistance against damage caused by dust particles, and it is still well processable with conventional abrasive materials. It has also suitable thermal properties, namely low coefficient of thermal expansion, which is lower than in case of natural spinels and corundum, and which enables to process products of this material by the productive jewellery technology of lost wax casting.

The glass ceramic according to the present invention contains a certain minimum amount of $Na_2O$, which is introduced into it as an impurity from used initial components, namely from glass sand.

The glass ceramic according to the present invention contains a certain minimum amount of $Fe_2O_3$, which is introduced into it as an impurity from used initial components. In some cases $Fe_2O_3$ is purposefully added to the stem in order to colour the resulting material.

EXAMPLES

The examples of embodiment of the invention, together with the selected parameters of glass/glass ceramic, are mentioned in Table 2. The composition according to example 1 is a glass ceramic, which is blue, transparent, has the refractive index of 1.63, imitating the colour of sapphire. The compositions according to examples 2 and 3 are glass ceramics, which are transparent: yellow-green, imitating the colour of peridot, and green, imitating the colour of emerald, with the refractive index in the range from 1.62 to 1.67. The composition according to example 4 is a glass ceramic of non-transparent, blue-green (turquoise) colour. All these materials have a high heat resistance (colour and shape stability) and are suitable to be processed by the lost wax casting method.

TABLE 2

Examples of embodiments of the invention and selected parameters (in weight %)

| Oxide/Example | 1 | 2 | 3 | 4 |
|---|---|---|---|---|
| $Al_2O_3$ | 27.51 | 25.48 | 24.61 | 28.13 |
| $SiO_2$ | 32.4 | 30.03 | 29.01 | 33.16 |
| ZnO | 13.17 | 12.2 | 11.79 | |
| MgO | 4.35 | 4.03 | 3.89 | 11.12 |
| $B_2O_3$ | 8.35 | 7.72 | 7.46 | 8.53 |
| $TiO_2$ | 4.85 | | | |
| $ZrO_2$ | 9.15 | 15.39 | 14.87 | 17.00 |
| CoO | 0.08 | | | |
| NiO | 0.14 | | 1.42 | 2.06 |
| $Pr_2O_3$ | | 5.15 | 4.86 | |
| $MnO_2$ | | | 2.08 | |
| CuO | | | | |
| $Fe_2O_3$ | | | | |
| $Cr_2O_3$ | | | | |
| $V_2O_5$ | | | | |
| $Nd_2O_3$ | | | | |
| $Er_2O_3$ | | | | |
| AgO | | | | |
| Au | | | | |
| Examples of the technology of the crystallization process | | | | |
| Melting temperature | 1570° C. | 1585° C. | 1600° C. | 1620° C. |
| Nucleation | 660° C., 5 h | 710° C., 5 h | 680° C., 5 | 730° C., 5 h |
| Crystallization | 830° C., 25 h | 890° C., 15 h | 870° C., 20 | 950° C., 15 h |
| Selected detected parameters | | | | |
| Refractive index $n_d$ | 1.63 | 1.65 | 1.62 | — |
| Colour | blue | yellow-green | green | turquoise |
| Tg | 751 | 757 | 753 | 752 |

INDUSTRIAL APPLICABILITY

The present glass ceramic material is harmless (it does not contain compounds of Pb, Cd or As) and it is intended for use namely as a synthetic stone in fashion jewellery and jewellery industry. Thanks to the high content of spinel crystalline phase, it imitates faithfully the colours and optical-aesthetic properties of natural precious and semi-precious stones, namely spinel. Thanks to its excellent thermal properties (the shape and colour stability) and a low coefficient of thermal expansion, it may be preferably used in production of jewels by the lost wax casting method.

Obviously, the material may be used anywhere else, where it is convenient due to its properties.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A glass ceramic material for the production of fashion jewellery and jewellery stones with a high refractive index of at least 1.62 and a high heat resistance having a melting point of at least 1550° C., characterised in that it is formed by aluminium-boron-silicate glass with the addition of ZnO and MgO oxides, which forms by subsequent heat treatment a homogeneously dispersed nanocrystalline phase consisting of (in weight %):
   20-40% $SiO_2$,
   1.5-10% $B_2O_3$,
   20-35% $Al_2O_3$,
   0.1-20% MgO,
   0.1-20% ZnO,
   while the content of MgO+ZnO is at least 10%, and as nucleation agents for controlled bulk crystallization:
   0.1-15% $ZrO_2$,
   0-15% $TiO_2$,
   while the content of $TiO_2+ZrO_2$ is at least 5%.

2. A glass ceramic material for the production of fashion jewellery and jewellery stones with a high refractive index of at least 1.62 and a high heat resistance having a melting point of at least 1550° C. characterised in that it is formed by aluminium-boron-silicate glass with the addition of ZnO and MgO oxides, which forms by subsequent heat treatment a homogeneously dispersed nanocrystalline phase consisting of (in weight %):
   20-40% $SiO_2$, 1.5-10% $B_2O_3$,
20-35% $Al_2O_3$,
0.1-20% MgO,
0.1-20% ZnO,
while the content of MgO+ZnO is at least 10%,
after crystallization ≥20% of a crystalline phase of a spinel type and a crystalline phase related to a nucleation agent selected from the group consisting of $ZrO2$ and $ZrTiO_4$.

3. The glass ceramic material for the production of fashion jewellery and jewellery stones with a high refractive index and a high heat resistance according to claim 2, characterised in that a size of crystalline particles is ≤50 nm and the material is transparent.

4. The glass ceramic material for the production of fashion jewellery and jewellery stones with a high refractive index and a high heat resistance according to claim 2, characterised in that a size of crystalline particles is >50 nm and the material is translucent or opaque.

5. A glass ceramic material for the production of fashion jewellery and jewellery stones with a high refractive index of at least 1.62 and a high heat resistance having a melting point of at least 1550° C. characterised in that it is formed by aluminium-boron-silicate glass with the addition of ZnO and MgO oxides, which forms by subsequent heat treatment a homogeneously dispersed nanocrystalline phase consisting of (in weight %):
20-40% $SiO_2$,
1.5-10% $B_2O_3$,
20-35% $Al_2O_3$,
0.1-20% MgO,
0.1-20% ZnO,
while the content of MgO+ZnO is at least 10%, and as nucleation agents for controlled bulk crystallization:
0.1-15% $ZrO_2$,
0-15% $TiO_2$,
while the content of $TiO_2+ZrO_2$ is at least 5%, and 0.08-20% of colouring additives selected from the group consisting of: CoO, NiO, CuO, $Fe_2O_3$, $MnO_2$, $Cr_2O_3$, $V_2O_5$, $Pr_2O_3$, $CeO_2$, $Nd_2O_3$, $Er_2O_3$, AgO and Au.

6. The glass ceramic material for the production of fashion jewellery and jewellery stones with a high refractive index and a high heat resistance according to claim 1, characterised in that it comprises after crystallization ≥20% of a crystalline phase of a spinel type and a crystalline phase related to a nucleation agent selected from the group consisting of $ZrO_2$ and $ZrTiO_4$.

7. The glass ceramic material for the production of fashion jewellery and jewellery stones with a high refractive index and a high heat resistance according to claim 5, characterised in that it comprises after crystallization ≥20% of a crystalline phase of a spinel type and a crystalline phase related to a nucleation agent selected from the group consisting of $ZrO_2$ and $ZrTiO_4$.

8. The glass ceramic material for the production of fashion jewellery and jewellery stones with a high refractive index and a high heat resistance according to claim 6, characterised in that a size of crystalline particles is ≤50 nm and the material is transparent.

9. A glass ceramic material for the production of fashion jewellery and jewellery stones with a high refractive index of at least 1.62 and a high heat resistance having a melting point of at least 1550° C., characterised in that it is formed by aluminium-boron-silicate glass with the addition of ZnO and MgO oxides, which forms by subsequent heat treatment a homogeneously dispersed nanocrystalline phase consisting of (in weight %):
20-40% $SiO_2$,
1.5-10% $B_2O_3$,
20-35% $Al_2O_3$,
0.1-20% MgO,
0.1-20% ZnO,
while the content of MgO+ZnO is at least 10%, and
0.1-20% of colouring additives selected from the group consisting of: CoO, NiO, CuO, $Fe_2O_3$, $MnO_2$, $Cr_2O_3$, $V_2O_5$, $Pr_2O_3$, $CeO_2$, $Nd_2O_3$, $Er_2O_3$, AgO and Au,
characterised in that it comprises after crystallization ≥20% of a crystalline phase of a spinel type and a crystalline phase related to a nucleation agent selected from the group consisting of $ZrO_2$ and $ZrTiO_4$, and
characterised in that a size of crystalline particles is ≤50 nm and the material is transparent.

10. The glass ceramic material for the production of fashion jewellery and jewellery stones with a high refractive index and a high heat resistance according to claim 7, characterised in that a size of crystalline particles is ≤50 nm and the material is transparent.

11. The glass ceramic material for the production of fashion jewellery and jewellery stones with a high refractive index and a high heat resistance according to claim 6, characterised in that a size of crystalline particles is >50 nm and the material is translucent or opaque.

12. A glass ceramic material for the production of fashion jewellery and jewellery stones with a high refractive index of at least 1.62 and a high heat resistance having a melting point of at least 1550° C. characterised in that it is formed by luminium-boron-silicate glass with the addition of ZnO and MgO oxides, which forms by subsequent heat treatment a homogeneously dispersed nanocrystalline phase consisting of (in weight %):
20-40% $SiO_2$,
1.5-10% $B_2O_3$,
20-35% $Al_2O_3$,
0.1-20% MgO,
0.1-20% ZnO,
while the content of MgO+ZnO is at least 10%, and
0.1-20% of colouring additives selected from the group consisting of: CoO, NiO, CuO, $Fe_2O_3$, $MnO_2$, $Cr_2O_3$, $V_2O_5$, $Pr_2O_3$, $CeO_2$, $Nd_2O_3$, $Er_2O_3$, AgO and Au,
characterised in that it comprises after crystallization ≥20% of a crystalline phase of a spinel type and a crystalline phase related to a nucleation agent selected from the group consisting of $ZrO_2$ and $ZrTiO_4$, and
characterised in that a size of crystalline particles is >50 nm and the material is translucent or opaque.

13. The glass ceramic material for the production of fashion jewellery and jewellery stones with a high refractive index and a high heat resistance according to claim 7, characterised in that a size of crystalline particles is >50 nm and the material is translucent or opaque.

\* \* \* \* \*